(12) United States Patent  (10) Patent No.: US 8,024,016 B2
Lim et al.  (45) Date of Patent: Sep. 20, 2011

(54) PORTABLE ELECTRONIC DEVICE (75) Inventors: Seung-Geun Lim, Seoul (KR); Won-Seok Joo, Seoul (KR); Sung-Min Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 686 days.

(21) Appl. No.: 11/723,912

(22) Filed: Mar. 22, 2007

(65) Prior Publication Data

US 2008/0019083 A1 Jan. 24, 2008

(30) Foreign Application Priority Data

Jul. 18, 2006 (KR) ........................ 10-2006-0067067
Aug. 21, 2006 (KR) ........................ 10-2006-0079071

(51) Int. Cl.
 *H04M 1/00* (2006.01)
(52) U.S. Cl. .................. 455/575.4; 455/575.8
(58) Field of Classification Search ............... 455/575.1, 455/575.3, 575.4, 575.8, 128, 347; 379/428.01, 379/433.01, 433.11, 433.12, 433.13, 440
See application file for complete search history.

(56) References Cited

U.S. PATENT DOCUMENTS

| 5,235,492 | A |   | 8/1993 | Humbert et al. |
| 6,117,526 | A | * | 9/2000 | Marks ............ 428/192 |
| 6,299,467 | B1 |   | 10/2001 | Chien |
| 6,311,077 | B1 | * | 10/2001 | Bien ............ 455/566 |
| 6,490,438 | B1 |   | 12/2002 | Wu |
| 7,747,006 | B2 | * | 6/2010 | Kim et al. ........... 379/434 |
| 2002/0006809 | A1 |   | 1/2002 | Kubo et al. |
| 2002/0019252 | A1 | * | 2/2002 | Kuroda ............ 455/575 |
| 2002/0114447 | A1 |   | 8/2002 | Ooya et al. |
| 2003/0045246 | A1 | * | 3/2003 | Lee et al. .......... 455/90 |
| 2004/0090737 | A1 |   | 5/2004 | Shimura et al. |
| 2004/0209576 | A1 | * | 10/2004 | Lee ............... 455/90.3 |
| 2004/0229668 | A1 | * | 11/2004 | Lin .............. 455/575.3 |
| 2005/0003871 | A1 | * | 1/2005 | Shiue et al. ....... 455/575.3 |
| 2005/0054399 | A1 | * | 3/2005 | Buris ............ 455/575.7 |
| 2005/0059444 | A1 | * | 3/2005 | Martinez et al. ..... 455/575.7 |
| 2005/0079891 | A1 |   | 4/2005 | Lee |
| 2005/0243486 | A1 |   | 11/2005 | Wingfield et al. |
| 2005/0282593 | A1 | * | 12/2005 | Spence et al. ...... 455/575.3 |
| 2006/0142072 | A1 |   | 6/2006 | Krenz et al. |
| 2007/0021156 | A1 |   | 1/2007 | Hoong et al. |
| 2007/0152689 | A1 |   | 7/2007 | Lee et al. |
| 2007/0184812 | A1 | * | 8/2007 | Bitton ............ 455/344 |
| 2007/0195512 | A1 |   | 8/2007 | Konno |
| 2008/0102351 | A1 |   | 5/2008 | Lee |

FOREIGN PATENT DOCUMENTS

| CN | 1264237 A | 8/2000 |
| CN | 2546462 Y | 4/2003 |
| CN | 2572679 Y | 9/2003 |
| CN | 1777049 A | 5/2006 |
| EP | 0 522 538 A2 | 1/1993 |
| EP | 0932288 A1 | 7/1999 |
| EP | 1 381 204 A2 | 1/2004 |

(Continued)

*Primary Examiner* — Nguyen Vo (74) *Attorney, Agent, or Firm* — Birch, Stewart, Kolasch & Birch, LLP (57) ABSTRACT

A portable electronic device having a front cover, a rear cover, and wherein one of the front cover and the rear cover is metallic and has a pattern portion with a predetermined pattern. In addition, a portable electronic device having a front cover, a rear cover, and a metallic pattern layer provided on at least one of the covers, the metallic pattern layer having a predetermined pattern.

25 Claims, 11 Drawing Sheets

FOREIGN PATENT DOCUMENTS

| | | |
|---|---|---|
| EP | 1 408 580 A2 | 4/2004 |
| EP | 1476005 A1 | 11/2004 |
| JP | 08-204380 | 8/1996 |
| JP | 2000-349874 * | 12/2000 |
| JP | 2003-158562 A | 5/2003 |
| KR | 10-2000-0049436 A | 8/2000 |
| KR | 2001-0086654 A | 9/2001 |
| KR | 10-2006-0021200 A | 3/2006 |
| KR | 10-2006-0064997 A | 6/2006 |
| KR | 10-2006-0074222 A | 7/2006 |
| KR | 10-2006-0091837 A | 8/2006 |
| KR | 10-2006-0100361 A | 9/2006 |
| TW | 1243574 B | 11/2005 |
| TW | I268088 B | 12/2006 |
| WO | WO-01/15617 A1 | 3/2001 |

* cited by examiner

PORTABLE ELECTRONIC DEVICE

CROSS REFERENCE TO RELATED APPLICATIONS

This application claims the benefit of priority to Korean Application Nos. 10-2006-0067067, filed on Jul. 18, 2006, and 10-2006-0079071, filed on Aug. 21, 2006, which are herein expressly incorporated by reference in their entireties.

BACKGROUND OF THE INVENTION

1. Field of the Invention

The present invention relates to a portable electronic device, and more particularly, to a portable electronic device having cover portions that form an appearance of the portable electronic device.

2. Description of Related Art

Generally, a portable electronic device performs many different functions that are used by a user. However, in addition to being multifunctional, users prefer that the portable electronic device be lightweight and easy to manipulate.

In some ways today, the portable electronic device is regarded as a fashion item. According to recent trends, the body of the portable electric device is being formed of a material different than conventional plastic materials. For example, the body of the portable electronic device may be formed of a metallic material. However, sometimes being formed of a metallic material is insufficient to differentiate the body from one formed of a plastic material simply by touch or sight.

Furthermore, there are some needs for the portable electronic device formed of a non-metallic material to appear to be formed of a metallic material.

BRIEF SUMMARY OF THE INVENTION

Therefore, an object of the present invention is to provide a portable electronic device capable of implementing a metallic property different from a plastic property.

Another object of the present invention is to provide a portable electronic device capable of implementing a metallic property while the body is formed of a non-metallic material.

To achieve these and other advantages and in accordance with the purpose of the present invention, as embodied and broadly described herein, there is provided a portable electronic device having a front cover, a rear cover, and wherein one of the front cover and the rear cover is metallic and has a pattern portion with a predetermined pattern.

In a further aspect, the portable electronic device may include a body having a plurality of electronic components and a battery compartment, where the rear cover is a battery cover for covering the battery compartment, and the rear cover has the pattern portion.

In another aspect, the pattern portion may be a plurality of grooves. For example, the plurality of grooves may be a plurality of parallel hair lines. Alternatively, the plurality of grooves may form one of characters, symbols, graphics, and combinations thereof.

In another aspect, the portable electronic device may be a mobile communication terminal having a wireless communication module.

In accordance with the purpose of the present invention, as embodied and broadly described herein, there is also provided a portable electronic device having a front cover, a rear cover, and a metallic pattern layer provided on at least one of the covers, the metallic pattern layer having a predetermined pattern.

In another aspect, the metallic pattern layer may include a film. For example, the film may be formed of one of polycarbonate (PC), polyethyleneterephthalate (PET), and acryl.

In yet another aspect, the metallic pattern layer includes a pattern member provided on the at least one of the covers, and a metal layer deposited on the pattern member using metallic particles.

In a further aspect, a protection layer may cover the metallic pattern layer and the protection layer may be formed of a transparent material.

In accordance with the purpose of the present invention, as embodied and broadly described herein, there is also provided a portable electronic device having a body housing a plurality of electronic components, the body having a front portion and a rear portion, a display located in the front portion, a battery compartment located in the rear portion, a front cover, a rear cover covering the battery compartment, and a metallic pattern layer provided on at least one of the covers, the metallic pattern layer having a predetermined pattern.

In another aspect, the front portion may have a display window having a first reflectivity, and the metallic pattern portion may have a second reflectivity less than the first reflectivity of the display window.

In accordance with the purpose of the present invention, as embodied and broadly described herein, there is also provided a mobile phone having a front body portion and a rear body portion, a front cover at least partially covering the front body portion, and a rear cover at least partially covering the rear body portion, wherein one of the front cover and the rear cover is metallic and has a pattern portion with a predetermined pattern.

In another aspect, a battery compartment may be located in the rear body portion. In addition, the rear cover is a battery cover for covering the battery compartment, and the rear cover has the pattern portion.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
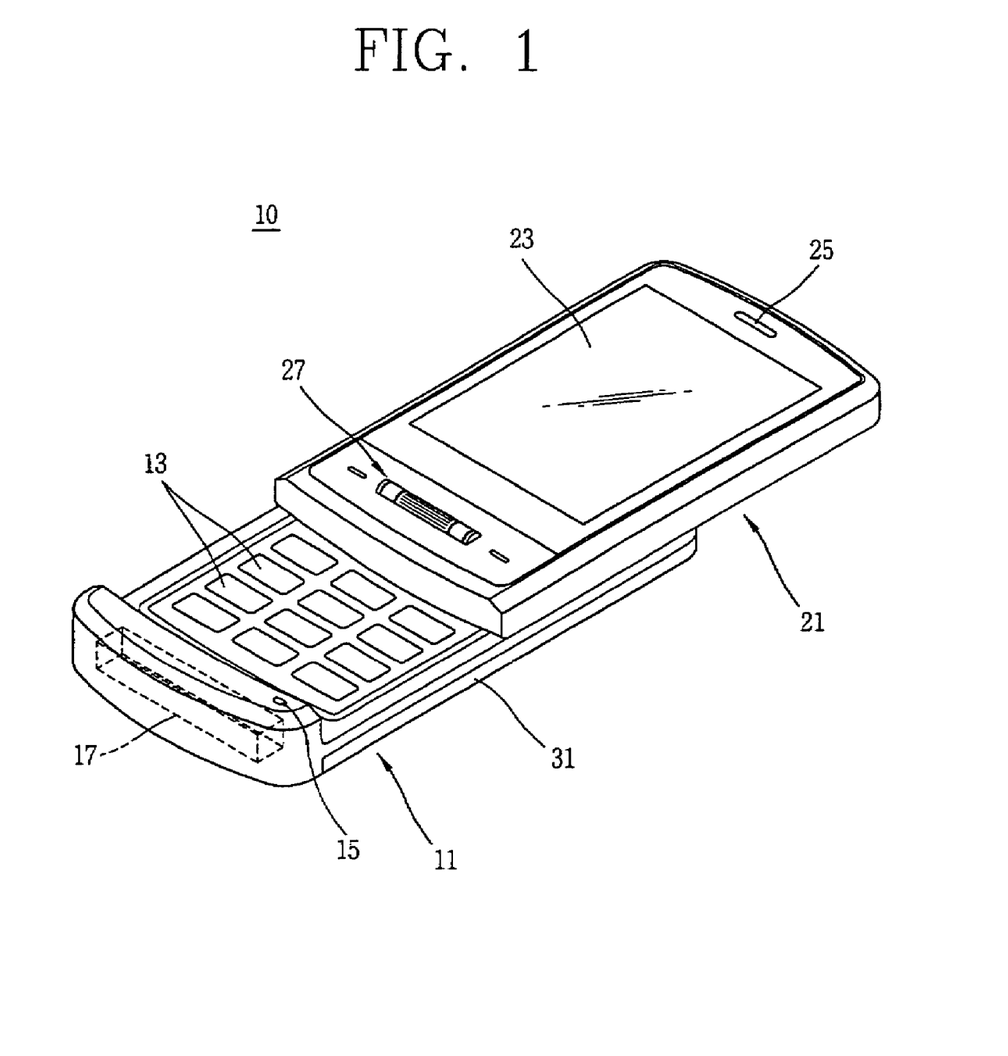
FIG. 1 is a perspective view showing a front surface of a portable electronic device according to a first embodiment of the present invention.
Figure 2:
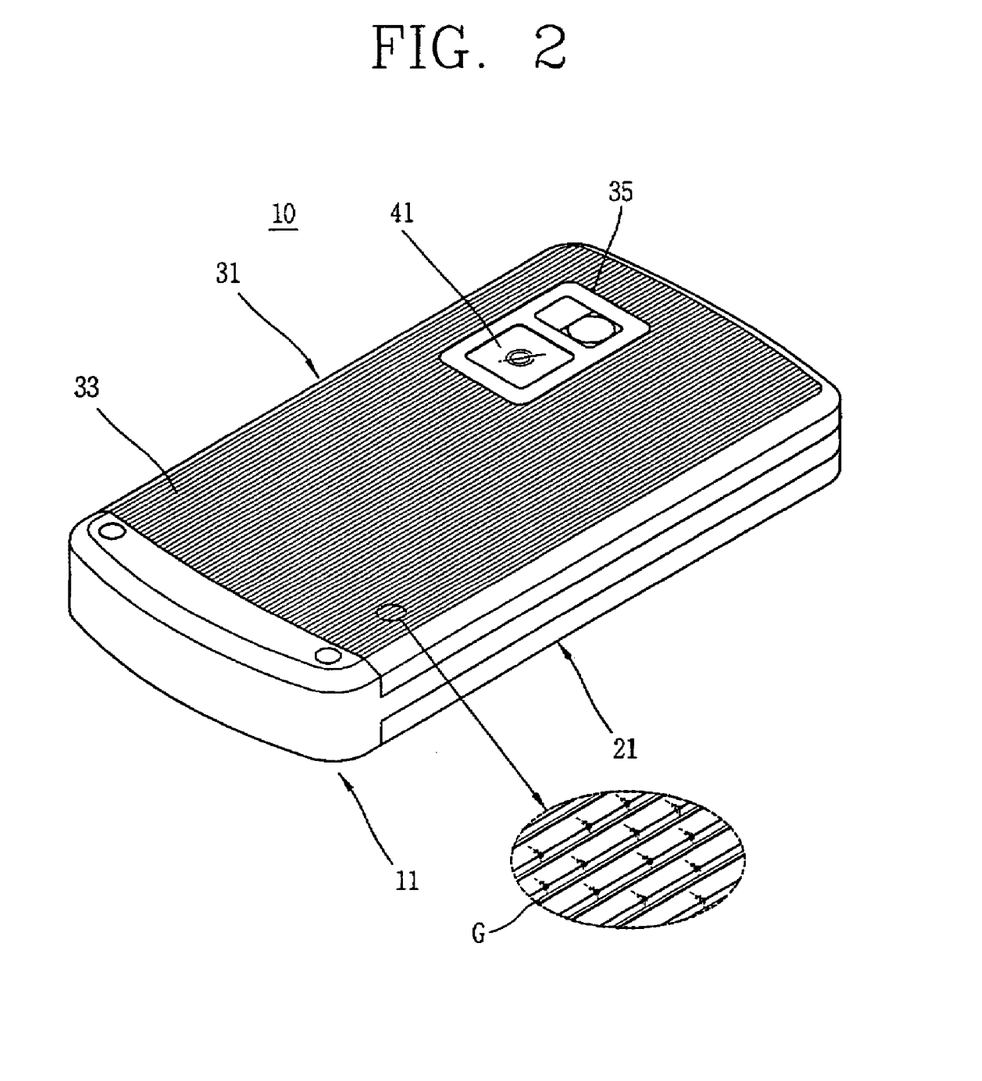
FIG. 2 is a perspective view showing a rear surface of the portable electronic device of FIG. 1.

Hereinafter, a portable electronic device according to the present invention will be explained in more detail. FIG. 1 is a perspective view showing a front surface of a portable electronic device according to a first embodiment of the present invention, and FIG. 2 is a perspective view showing a rear surface of the portable electronic device of FIG. 1. The portable electronic device 10 is a mobile communication terminal or mobile phone that performs a wireless communication function with a wireless communication module (not shown). However, the portable electronic device 10 is not limited to the mobile communication terminal. The present invention may be applied to any electronic device that is carried by a user such as a PDA, a portable game device, a portable music player, and a portable calculator.

Referring to FIGS. 1 and 2, the portable electronic device 10 comprises a first body 11 and a second body 21 coupled to each other so as to be opened and closed in a sliding manner. A plurality of keys 13 are disposed at a front surface of the first body 11. A microphone 15 is disposed at a protruding portion adjacent to the keys 13. An antenna 17 for wireless communication is mounted in the protruding portion. A display 23 having a display window and a speaker 25 are disposed at a front surface of the second body 21. A rotatable input unit 27 is rotatably mounted at the second body 21 adjacent to the display 23.

A rear cover, such as a battery cover 31, is detachably coupled to a rear surface of the first body 11. The battery cover 31 covers a battery in a battery compartment (not shown) that is coupled to the first body 11 and supplies power to the first body 11 and the second body 21.

The battery cover 31 is a metallic plate having an opening 35 to expose a camera 41 mounted at the first body 11. The battery cover 31 covers at least part of a rear surface of the first body 11, thereby forming an appearance of the first body 11. Preferably, the battery cover 31 covers substantially all of the rear surface of the first body 11. A pattern portion 33 having a predetermined pattern is formed at an outer surface of the battery cover 31 and contributes to the appearance of the portable electronic device 10.

The pattern portion 33 may be formed on the outer surface of the battery cover 31 in a groove form. The grooves G may be formed in a thin and long shape, which may be described as hair lines. FIG. 2 shows the hair lines arranged in parallel. The hair lines are formed by rotating a roller (not shown), on which sandpaper is wound, on the battery cover 31, or by scratching the battery cover 31 with a cutter. It is understood that the grooves could be oriented in many different directions in addition to being parallel.

Figure 3:
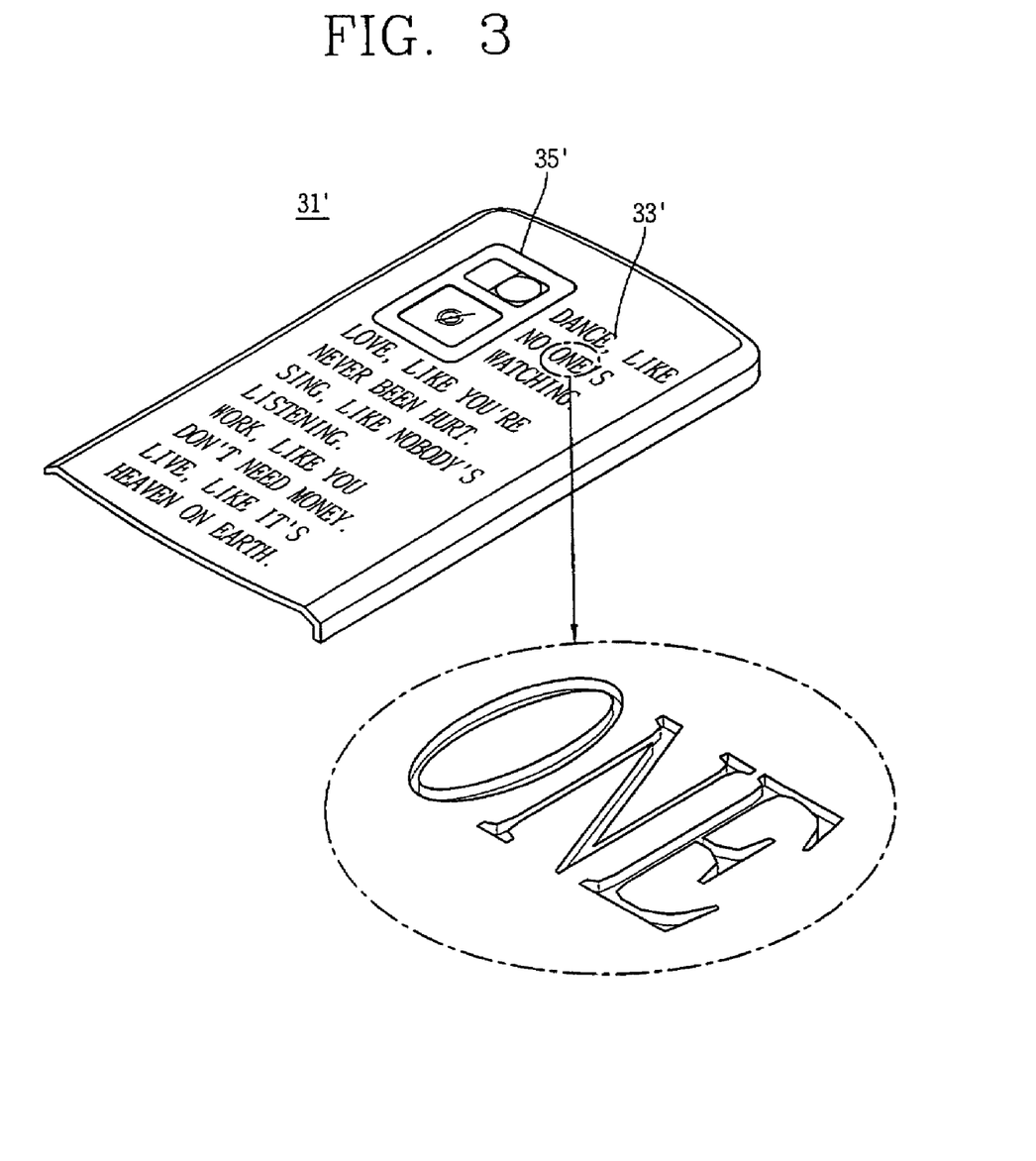
FIG. 3 is a perspective view showing a modification example of a battery cover of FIG. 2.

FIG. 3 is a perspective view showing a modification example of the battery cover 31 of FIG. 2. Referring to FIG. 3, a battery cover 31' has a pattern portion 33' and an opening 35' similarly to the aforementioned battery cover 31.

The pattern portion 33' is formed of characters and not the aforementioned hair lines. More specifically, a poem is written on an outer surface of the battery cover 31'. The poem is written in a recessed form by a cutter like the aforementioned grooves on the pattern portion 33 of FIG. 2. The recessed form can be best seen with reference to the enlarged portion 'ONE' of the poem.

Since the battery covers 31, 31' formed of a metallic material are provided with the pattern portions 33 and 33' in a groove form, light incident on the battery covers 31 and 31' scatters in different directions. By the scattering of light, a user can differentiate between the battery covers 31, 31' and those having a smooth metallic surface. Furthermore, the user can have more enhanced grip of the battery covers 31, 31' due to the pattern portions 33, 33'. The pattern portions 33, 33' assist in preventing the portable electronic device 10 from slipping off the user's hand. In addition, the reflectivity of the pattern portions 31, 31' are distinguishable from the reflectivity of the display window of the display 25. For example, the display window of the display 25 may be made of a reflective material that, allows one-way light transmission when the display is on, and the reflectivity of the pattern portions 31, 31' are less reflective than the display window of the display 25.

The first body 11 and the second body 21 of the portable electronic device 10 were exemplified as a slide type. However, the present invention may be applicable to a bar type, a folder type, etc. In addition, while the pattern portions 33, 33' are described as being located on the battery covers 31, 31', the pattern portions 33 and 33' may be formed at other parts of the portable electronic terminal 10. The pattern portions 33, 33' are not limited to hair lines or characters, but may have various forms such as symbols, graphics, or signatures.

A portable electronic device 50 according to a second embodiment of the present invention will be explained with reference to FIGS. 4 to 12.

Figure 4:
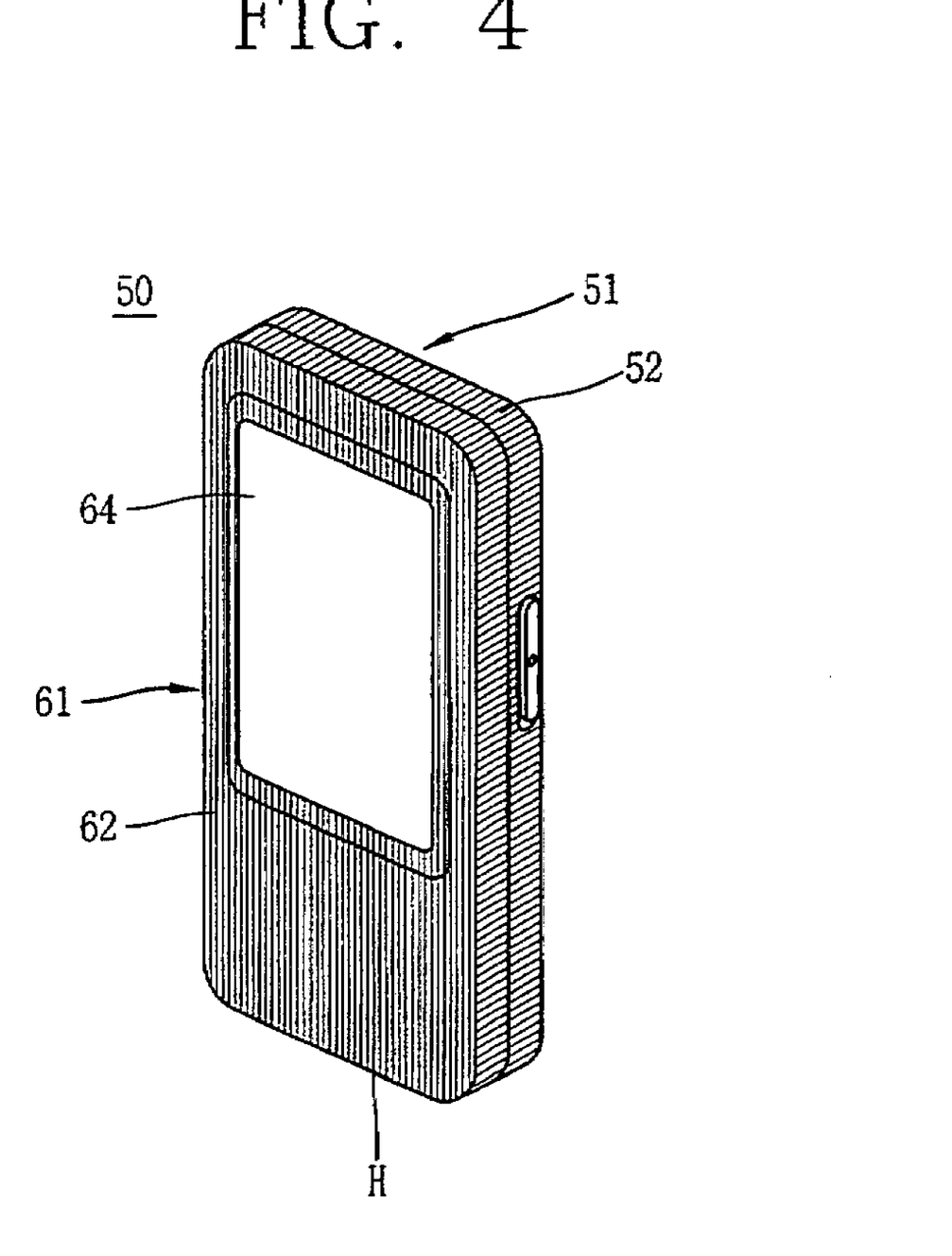
FIG. 4 is a perspective view showing an appearance of a portable electronic device according to a second embodiment of the present invention.

FIG. 4 is a perspective view showing an appearance of the portable electronic device according to a second embodiment of the present invention. The portable electronic device 50 may be a mobile communication terminal, such as a mobile phone, having a wireless communication module (not shown), or a different type of electronic device like in the first embodiment.

Referring to FIG. 4, the portable electronic device 50 comprises a first body 51 and a second body 61 slidably connected to each other. A first cover 52 forms an appearance of the first body 51, and a second cover 62 and a display window 64 form an appearance of the second body 61. The display window 64 is a transparent window for covering a display (not shown). An antenna (not shown) is mounted in the first body 51 and the second body 61.

The first cover 52 and the second cover 62 are formed of plastic, and are provided with a metallic layer having a pattern such as hair lines H on each outer surface thereof. The hair lines H may be formed on an entire surface or a part of the first cover 52 and the second cover 62.

As light scattering occurs by the hair lines H formed on each surface of the first cover 52 and the second cover 62, the user can perceive a metallic feeling from the portable electronic device 50. Also, since the first cover 52 and the second cover 62 are formed of plastic, the portable electronic device 50 of the second embodiment has a weight lighter than that of the portable electronic device of the first embodiment. The hair lines H also enhance the user's grip feeling, and prevents the portable electronic device 50 from slipping from the user's hand.

The metallic patterns, that is, the hair lines H, may formed at the first cover 52 and the second cover 62 by several methods.

Figure 5:
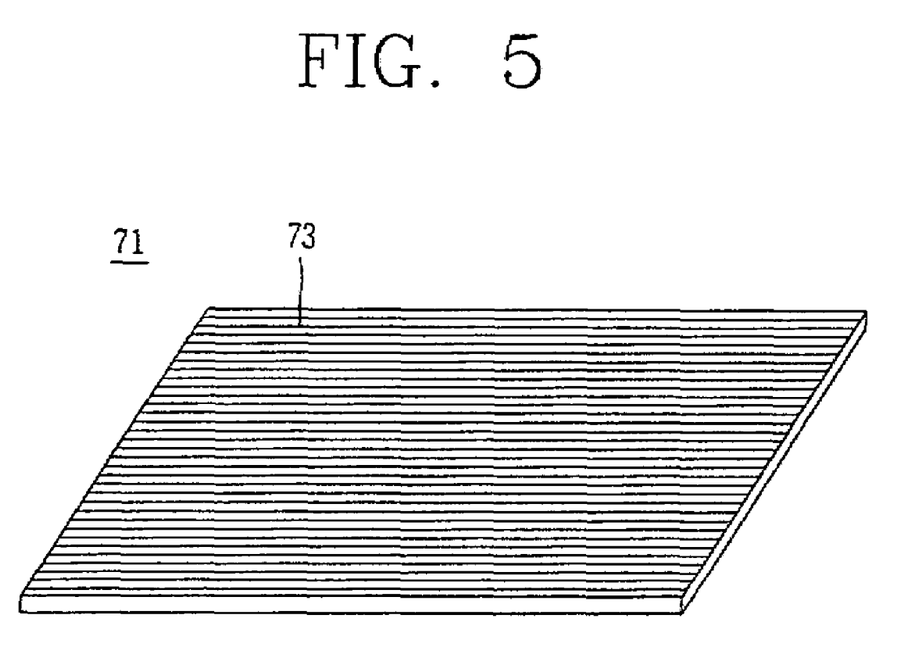
FIGS. 5 and 6 are perspective views showing pattern portions formed at pattern members.
Figure 6:
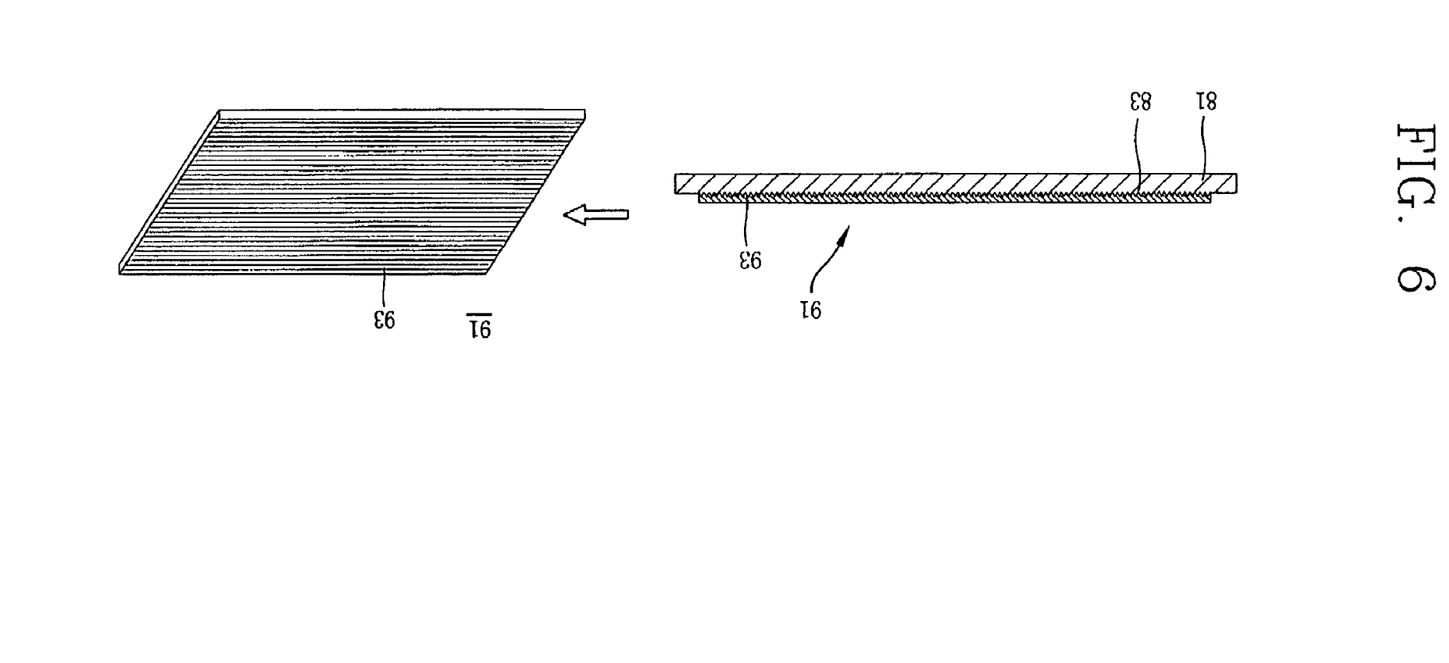

FIGS. 5 and 6 are perspective views showing pattern portions 73 and 93 formed at pattern members 71 and 91.

Referring to FIG. 5, the pattern member 71 is formed of a thin film. The film may be formed of polycarbonate, polyethyleneterephthalate, acryl, or other suitable materials.

Like the pattern portion 33 of FIG. 2, a pattern portion 73 may be formed as grooves on one surface of the film 71 by sandpaper or a cutter. The pattern portion 73 is formed as a plurality of thin and long grooves or hair lines disposed parallel to each other.

In an alternative method, as shown in FIG. 6, a material, such as polycarbonate, is injection-molded to a mold 81 having concave-convex pattern portions 83, thereby forming a pattern member on film 91. Once the film 91 is separated from the mold 81, a pattern portion 93 corresponding to the pattern portion 83 is formed at a contact portion of the film 91 to the pattern portion 83.

Figure 7:
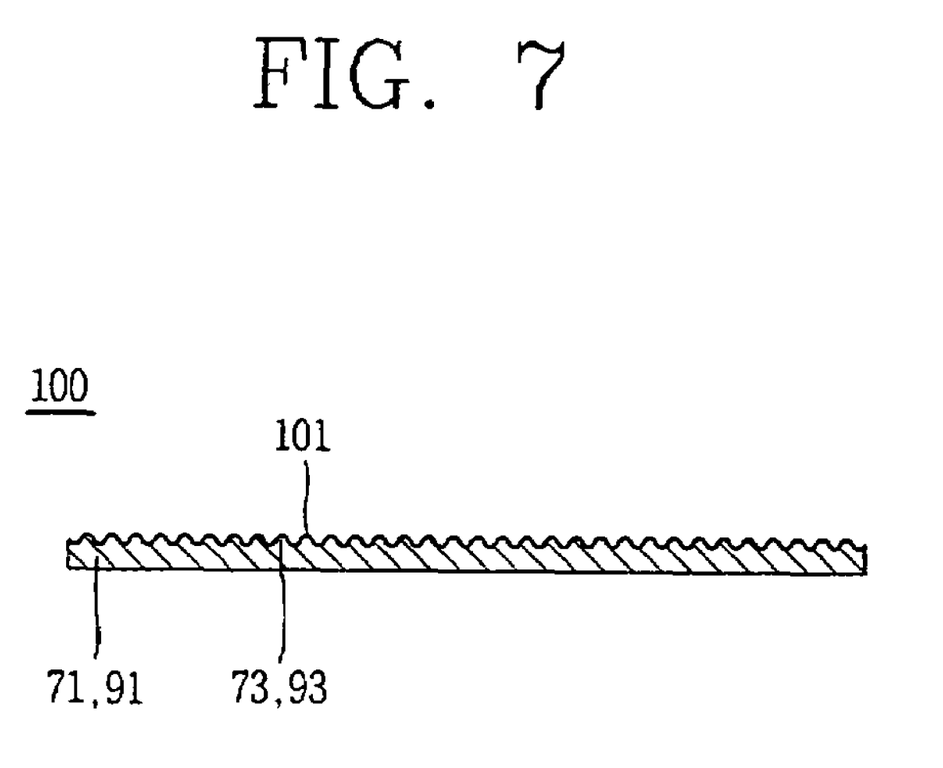
FIG. 7 is a sectional view showing a metal layer formed at each film of FIGS. 5 and 6.

FIG. 7 is a sectional view showing that a metal layer 101 is formed on the films 71, 91 of FIGS. 5 and 6. The metal layer 101 is formed on the pattern portions 73, 93 of the films 71, 91, respectively. Hereinafter, the films 71, 91 having the metal layer 101 thereon are referred to as a film assembly 100.

In order to form the film assembly 100, metallic particles may be deposited on the films 71, 91 by vacuum plating. Accordingly, the metal layer 101 is formed on the surface where the pattern portions 73, 93 of the films 71, 91 are formed, respectively, thereby forming the film assembly 100. The pattern portions 73 and 93 maintain the original form despite the metal layer 101 because the metal layer 101 is deposited on the films 71, 91 with the substantially same thickness so that the pattern portions 73, 93 are not deformed by the metal layer 101.

Figure 8:
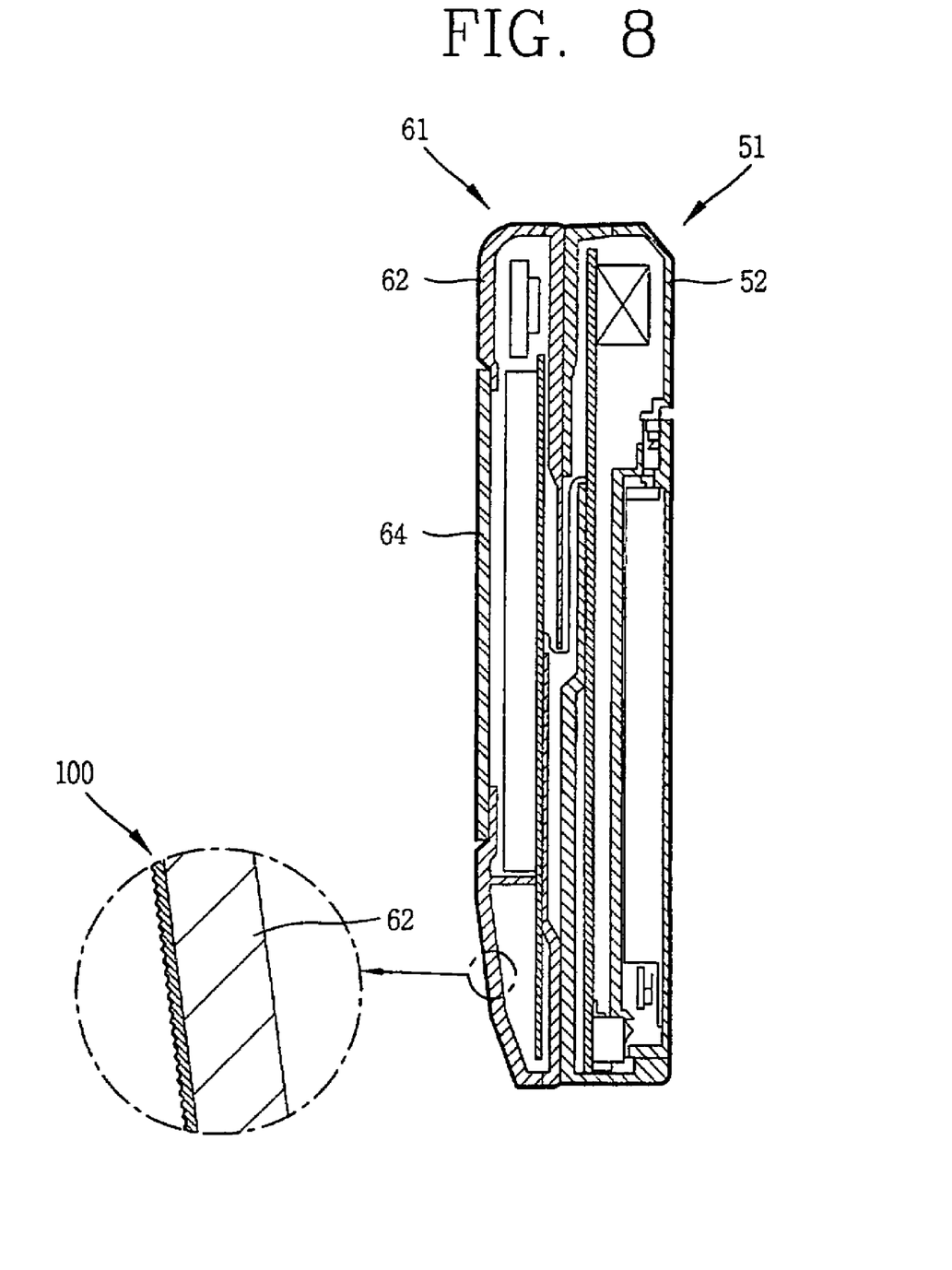
FIG. 8 is a longitudinal sectional view of the portable electronic device of FIG. 4 to which a film assembly of FIG. 7 is coupled.
Figure 9:
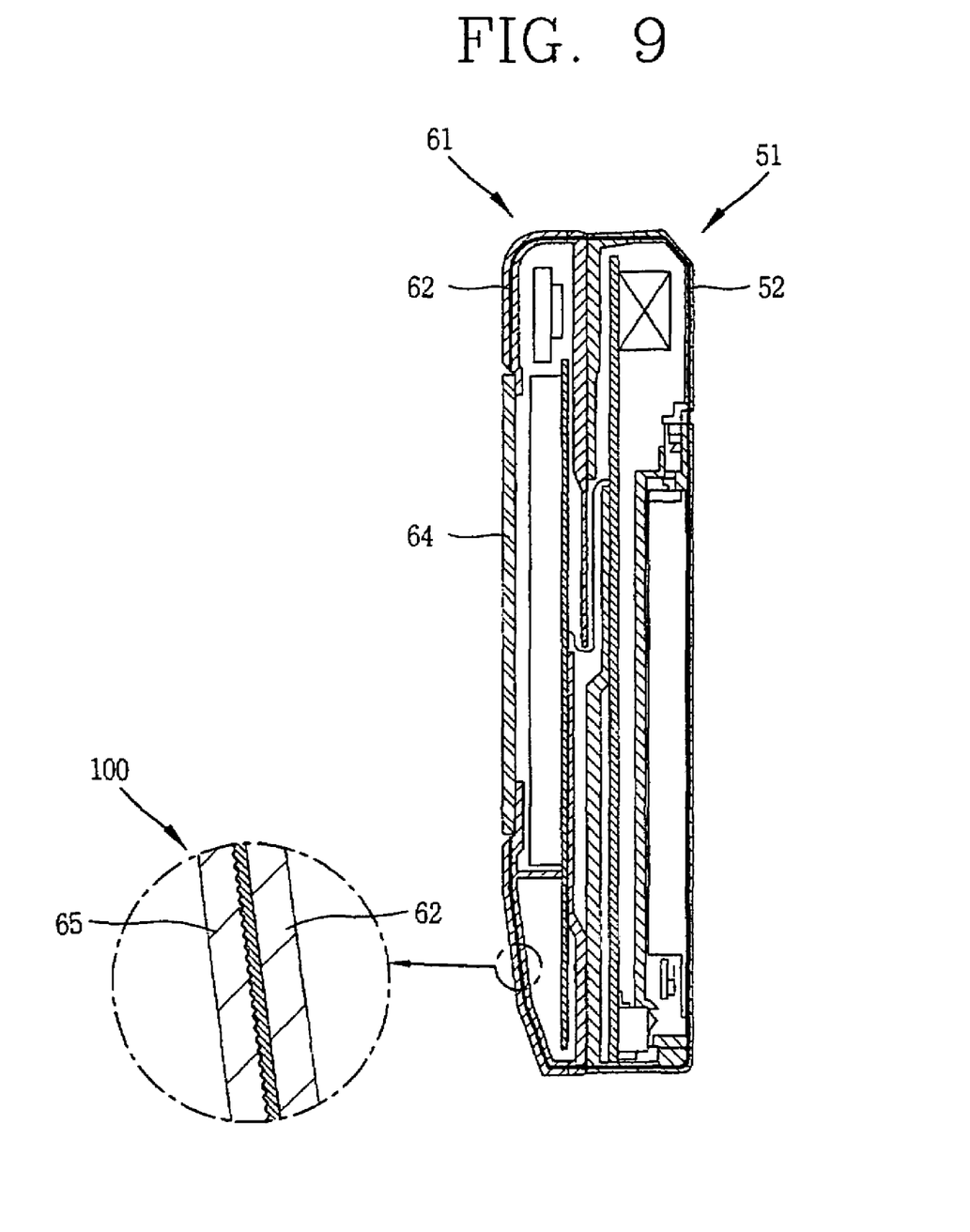
FIG. 9 is a longitudinal sectional view of the portable electronic device of FIG. 8, in which a protection layer is coupled to the film assembly.

FIG. 8 is a longitudinal sectional view of the portable electronic device of FIG. 4 to which the film assembly 100 of FIG. 7 is coupled, and FIG. 9 is a longitudinal sectional view of the portable electronic device of FIG. 8, in which a protection layer 65 is additionally coupled to the film assembly 100.

Referring to FIG. 8, the film assembly 100 is disposed on each outer surface of the second cover 62 and the first cover 52. The first cover 52 and the second cover 62 are formed by a plastic injection-molding.

Even if the first cover 52 and the second cover 62 are formed of a non-metallic material, the film assembly 100 appears to have a metallic pattern (i.e., the pattern portions 33 and 33' of the first embodiment).

Referring to FIG. 9, a protection layer 65 for covering the film assembly 100 that forms an appearance of the first cover 52 and the second cover 62 may be additionally provided. The protection layer 65 is formed of a transparent material, thereby protecting the film assembly 100 and enabling the pattern of the film assembly 100 to be seen from outside.

A method for integrally forming the film assembly 100 and the protection layer 65 to the first cover 52 and the second cover 62 will be explained with reference to FIGS. 10 to 12.

Figure 10:
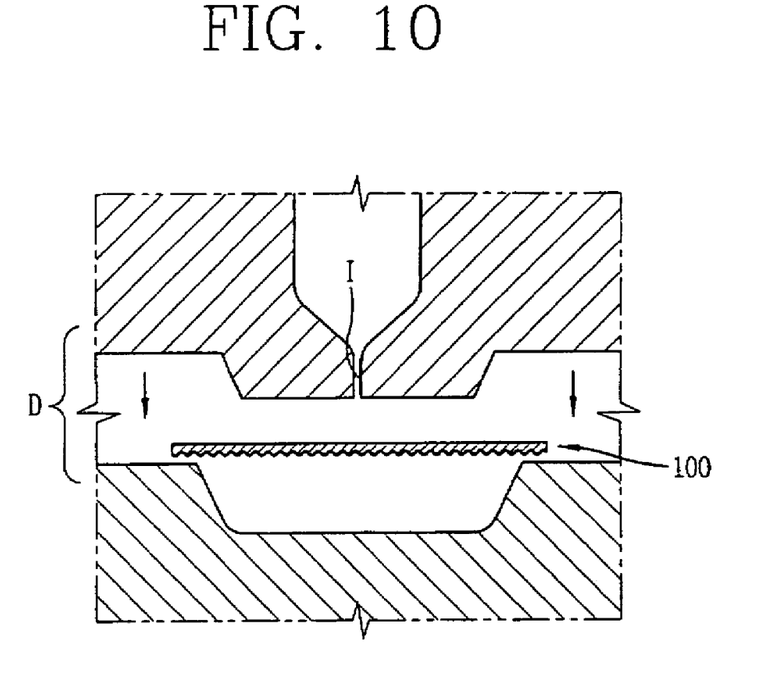
FIG. 10 is a frontal view showing the film assembly having been inserted into a mold.

Referring to FIG. 10 the film assembly of FIG. 7 is disposed in a mold (die) D. The mold D includes an upper member and a lower member. An injection space having a shape corresponding to the first cover 52 and the second cover 62 of FIG. 4 is formed at the part where the film assembly 100 is disposed.

Figure 11:
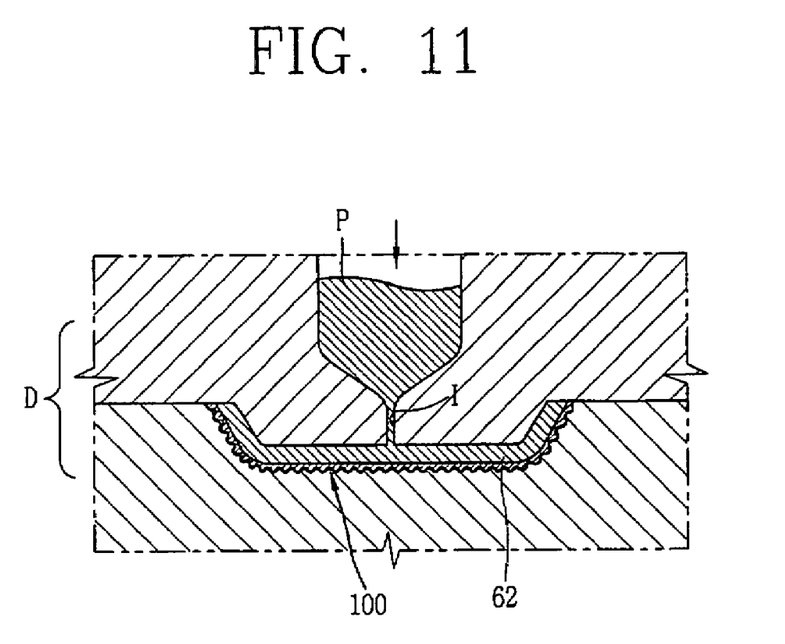
FIG. 11 is a frontal view showing that a cover is integrally injection-molded to the film assembly of FIG. 10.
Figure 12:
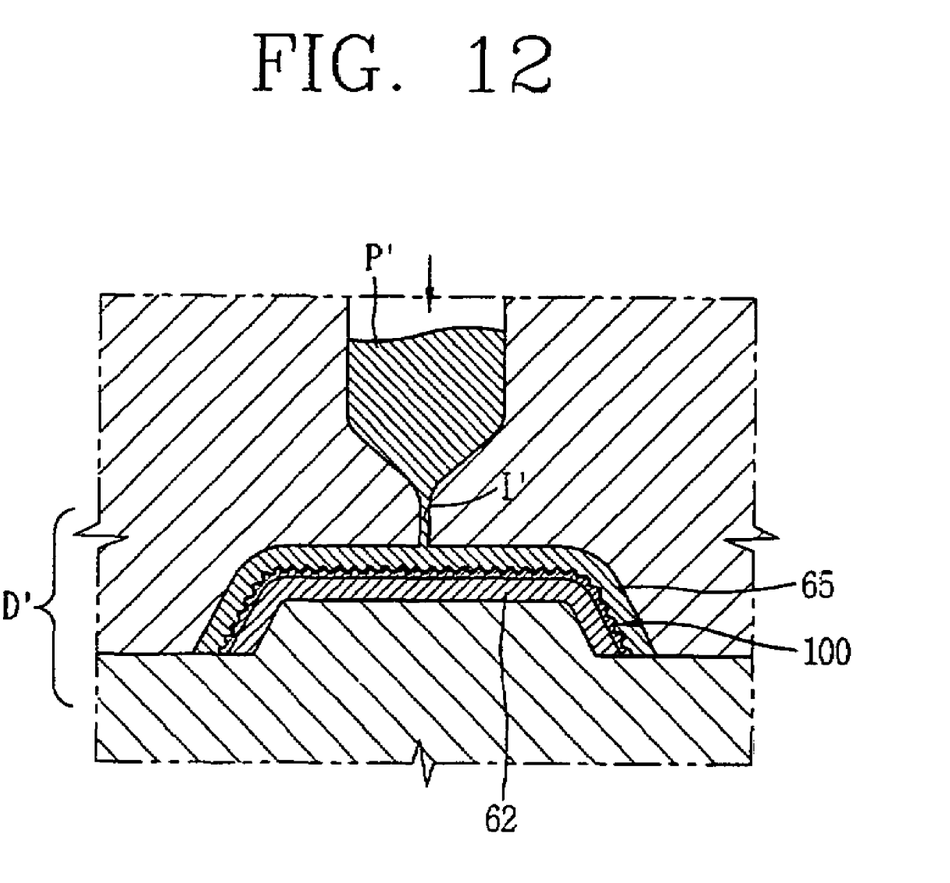
FIG. 12 is a frontal view showing that a protection layer is injection-molded to an outer surface of the film assembly of FIG. 11.

Referring to FIG. 11 melted plastic P is injection-molded into the injection space through an inlet I of the upper member. The melted plastic P is hardened in the injection space, thereby forming the first cover 52 and the second cover 62. In FIG. 11, the second cover 62 is formed by the hardened plastic P.

According to the above process, the first cover 52 and the second cover 62 are covered by the film assembly 100. As shown in FIG. 12, the film assembly 100 is protected by the protection layer 65 as plastic P' is injection-molded into a new mold D' once more. The plastic P' of the protection layer 65 is a transparent plastic.

As the present invention may be embodied in several forms without departing from the spirit or essential property thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed:

1. A portable electronic device comprising:
a body including a camera mounted at a rear surface of the body;
a front cover; and
a rear cover housing a plurality of electronic components with the front cover,
wherein a metallic plate is mounted at the rear cover and has a pattern portion configured with a plurality of grooves with a predetermined pattern,
wherein the plurality of grooves are linearly formed in the metallic plate and the plurality of grooves are arranged in parallel,
wherein the metallic plate covers the rear surface of the rear cover to form an appearance of the body, and
wherein the metallic plate has an opening to expose the camera therethrough and the opening is formed to be surrounded by the plurality of grooves.

2. The portable electronic device of claim 1, wherein the body has a battery compartment, and the rear cover is a battery cover for covering the battery compartment.

3. The portable electronic device of claim 1, wherein the plurality of grooves is a plurality of parallel hair lines.

4. The portable electronic device of claim 1, wherein the portable electronic device is a mobile communication terminal having a wireless communication module.

5. The portable electronic device of claim 1, wherein the portable electronic device includes a body having an antenna, and the antenna is disposed outside an area covered by said one of the front cover and the rear cover.

6. The portable electronic device of claim 1, wherein the plurality of grooves are formed directly in a surface of the metallic plate.

7. The portable electronic device of claim 1, wherein the metallic plate is formed only of metal.

8. A portable electronic device comprising:
a body housing a plurality of electronic components, the body having a front portion and a rear portion;
a display located in the front portion;
a battery compartment located in the rear portion;
a front cover;
a rear cover covering the battery compartment; and a metallic pattern layer provided in at least one of said covers, the metallic pattern layer having a predetermined pattern, wherein the display is disposed within the predetermined pattern and the predetermined pattern surrounds outer sides of the display such that the metallic pattern layer is less reflective than the display.

9. The portable electronic device of claim 8, wherein the metallic pattern layer includes a film.

10. The portable electronic device of claim 9, wherein the film is formed of one of polycarbonate (PC), polyethyleneterephthalate (PET), and acryl.

11. The portable electronic device of claim 8, wherein the predetermined pattern is a plurality of grooves.

12. The portable electronic device of claim 11, wherein the plurality of grooves is a plurality of parallel hair lines.

13. The portable electronic device of claim 11, wherein the plurality of grooves form one of characters, symbols, graphics, and combinations thereof.

14. The portable electronic device of claim 8, further comprising a protection layer covering the metallic pattern layer.

15. The portable electronic device of claim 14, wherein the protection layer is formed of a transparent material.

16. The portable electronic device of claim 8, wherein the portable electronic device is a mobile communication terminal having a wireless communication module.

17. A mobile phone comprising:
a front body portion and a rear body portion;
a camera mounted at a rear surface of the rear body portion;
a front cover at least partially covering the front body portion; and
a rear cover at least partially covering the rear surface of the rear body portion,
wherein a metallic plate is mounted at the rear cover and has a pattern portion with a predetermined pattern formed therein,
an antenna is mounted in a protruding portion of the rear body portion,
the protruding portion is disposed outside an area covered by the metallic plate and is formed at an end portion of the rear cover, and
the metallic plate forms an appearance of the body and has an opening to expose the camera therethrough and the opening is formed to be surrounded by the predetermined pattern.

18. The mobile phone of claim 17, wherein the front body portion has a display window having a first reflectivity, and the metallic pattern portion has a second reflectivity less than the first reflectivity of the display window.

19. The mobile phone of claim 18, further comprising a battery compartment located in the rear body portion.

20. The mobile phone of claim 18, wherein the rear cover is a battery cover for covering the battery compartment.

21. The mobile phone of claim 17, wherein the predetermined pattern is a plurality of grooves.

22. The mobile phone of claim 21, wherein the plurality of grooves is a plurality of parallel hair lines.

23. The mobile phone of claim 21, wherein the plurality of grooves form one of characters, symbols, graphics, and combinations thereof.

24. The mobile phone of claim 17, wherein the front cover is metallic and has a pattern portion with a predetermined pattern.

25. The mobile phone of claim 17, wherein the opening is entirely surrounded by the predetermined pattern.

* * * * *